Nov. 2, 1965

F. M. YOUNG 3,214,841

MICROMETER SETTING SINE BAR

Filed June 19, 1961

FRANCIS M. YOUNG
*INVENTOR.*

BY

ATTORNEY

Nov. 2, 1965  F. M. YOUNG  3,214,841
MICROMETER SETTING SINE BAR
Filed June 19, 1961  2 Sheets-Sheet 2

FRANCIS M. YOUNG
*INVENTOR.*

BY *Clarence M. Fuch*

ATTORNEY

United States Patent Office 3,214,841
Patented Nov. 2, 1965

3,214,841
MICROMETER SETTING SINE BAR
Francis M. Young, 13628 37th Ave. S., Seattle, Wash.
Filed June 19, 1961, Ser. No. 117,906
9 Claims. (Cl. 33—174)

This present invention relates to the general art of hand operated machine tools and more particularly to a sine bar arrangement which is pivoted at one end to a base, the base and sine bar being accurately ground on all surfaces used in measuring angles and assembled to give precise angular settings. The device is very useful in many machine layout operations and in the set-up of power machine tools for precise operations. The sine bar and its base have alternate positions adapting them to a wide range of applications.

Following in step with technological developments in both machine tools and angle measuring instruments, an urgent need has developed for precise setting so that the desired predetermined degree of accuracy in this work can be achieved. The use of the pivoted sine bar is not new in this present field and no claim is made specifically for it in this present equipment. However, this equipment provides a very accurate means for the precise setting of the sine bar with respect to its pivotally connected base and a method is thus available that gives the accuracy of setting, normally down to one minute of an angle, which can be very accurately determined from a trigonometric table of natural sines. The ease with which the values can be obtained and the setting of the sine bar effected, is in turn reflected in greatly reduced time in setting up machine tools for precise work.

A principal object of this present invention therefore is to provide micrometer control of the settings of the sine bar with respect to its base.

A further object is to provide alternate positions for the main pivot of the sine bar and for the pivoting of the micrometer and its adapter so that a wide range of applications of this precise equipment can be made.

A further object of this invention is to provide a plurality of slidably positioned pins which may be moved transversely of the sine bar and which in turn may be engaged by set-up vises or clamp means so that the sine bar means of this invention can be readily adapted to a wide range of precision usefulness.

A further object of this invention is to provide a sine bar in which the value as read from a trigonometric natural sine table can be set directly on a micrometer which controls the angle indicated by the sine bar.

A further object of this invention is to provide accurately positioned lathe centers so that this device may be aligned with the center of rotation of the lathe and to thus be in a position to assist in turn in making a plurality of accurate settings of the lathe taper attachment or the lathe compound rest, and especially of the settings for providing the movement of the cutting tool in the machining of conical surfaces having an angle appreciably greater than that which can be accommodated by the taper attachment of the lathe.

Further objects, advantages and capabilities will be apparent from the disclosure in the drawings or may be comprehended or are inherent in the device.

Figure 3:
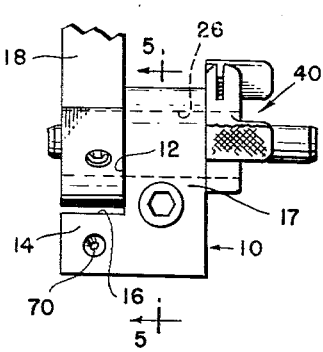
FIGURE 3 is an end view of this device taken from the left hand end of FIGURE 2 and with certain parts broken away.
Figure 4:
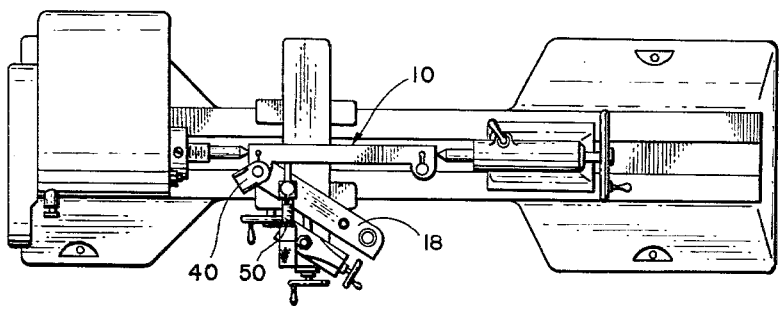
FIGURE 4 is a top plan view of a conventional lathe illustrating the employment of this present device in setting the compound rest of the lathe.

Referring to the drawings, throughout which like reference characters indicate like parts, the numeral 10 designates the base of my sine bar device. Base 10 is stepped as illustrated in FIGURE 3 so as to provide a front and forwardly extending foot portion 16 and a principal portion 17. Foot portion 16 is cut back far enough so that when the sine bar 18 is in contact with face 12 the forward face 14 of step or foot 16 and the front face of the sine bar 18 will be in a common plane. This step or foot 16 provides a common plane of the rear face of bar 18 and face 14 of the foot 16, and further it provides an adequate base so the device will stand upright. At each end the base 10 is provided with upstanding bosses 20 and 22, each having a length equal to the width of the principal portion of base 10. This is normally of somewhat greater transverse extent than the vertical bar portion 17. Transversely disposed cylindrical holes 26 adapted to alternately accept pivot members, one for each end of the sine bar, are precision machined in bosses 20 and 22.

The sine bar 18 is fitted with two accurately machined cylindrical holes 32 in which are seated bushings 34. Bushings 34 provide the pivots for the sine bar, there being one at each end of the bar. Bushings 34 provide bores which serve as bearings for pivot and the slidable alignment pins 31 and 33 for the sine bar. The bushings 34 which are a tight fit in sine bar 18 are ground flush with the back or rear side 35 of the sine bar and extend out on the front side of the bar far enough to pass through the appropriate boss 20 or 22 on base 10 and also into clamp means indicated generally by reference character 40 in FIGURE 3. Clamp 40 has two clamp members 41 and 43 which are spread by spring 40a, thus biasing the clamp to securely engage either of bushings 34 and hold the sine bar in place. While one of the bushings 34 is so positioned, the bushing 34 at the other end of the sine bar, if resting on base 10, is on a common horizontal center line with the holes 24 and 26 of the base 10. With the sine bar 18 in its down position, the bottom of base 10, the center line of bushings 34, the center line of the micrometer locating holes 42 and 44, the top of the lower portion 16 of base 10, the lower edge of the sine bar 18 and the upper edge of the sine bar are all true and parallel with each other.

The micrometer locating holes 42 and 44, which are equipped with hardened bushings in which the micrometer can be inserted, are on a true center line with bushings 34. In order to make this tool read the sine of the set angle in terms of the actual digits given in a table of natural trigonometric sines, these locating holes, 42 and 44, are located 1.000 inch inside of pivots 31 or 33 and on the center line of these pivots. A micrometer adapter 46 is made with a body bored vertically to receive a micrometer and slotted at 47 on the handle side and has suitable clamp screws, not shown, to provide for clamping and adjustment on the micrometer 50. On the opposite side, on a common center line, is a ground pivot pin 49 made integral with the body. This pin positions the micrometer in a selected micrometer locating hole, 42 and 44 as illustrated. The center line of pin 49 is on the center line of the micrometer pin as viewed one way and 90 degrees to the micrometer handle and rod 52 center line the other way. Micrometer controlled rod 52 has an end surface 54 of considerable diameter so that, when a setting is made on the micrometer which positions or determines the amount of pin 52 which protrudes beyond the micrometer adapter 46, this surface will position the axis of the micrometer at right angles to the upper surface 56 of base 10 and thus in effect complete the side of the triangle opposite the angle. Thus, if natural functions are used, the adjusted setting on the micrometer for a given angle, reading in inches, will be the actual digits of the natural trigonometric sine corresponding to the set angle.

Figure 1:
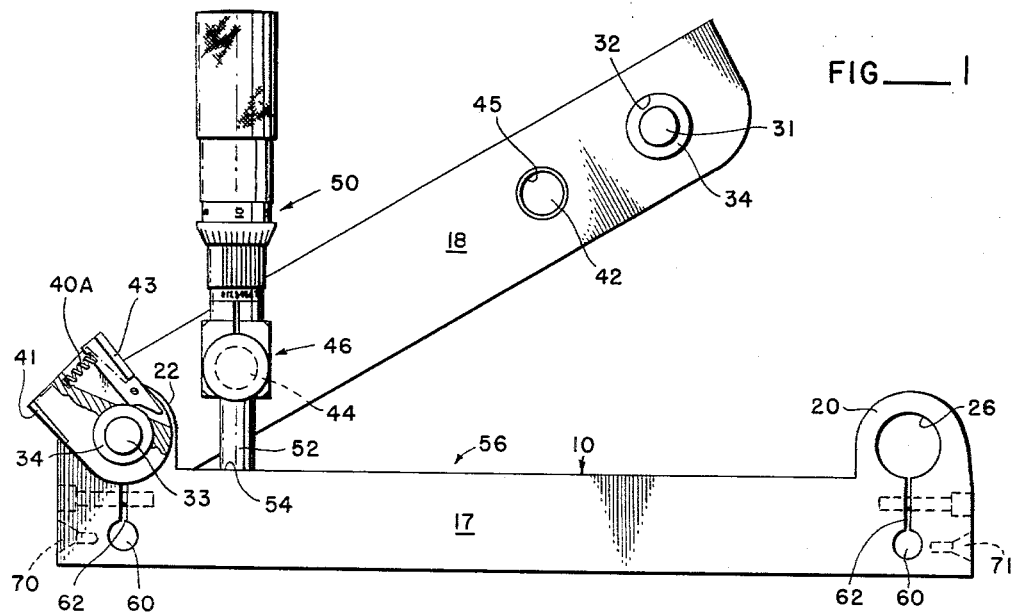
FIGURE 1 is a side elevation showing the sine bar being positioned at approximately 30 degrees, with the base to which it is pivoted and the same controlled by the micrometer means shown.
Figure 2:
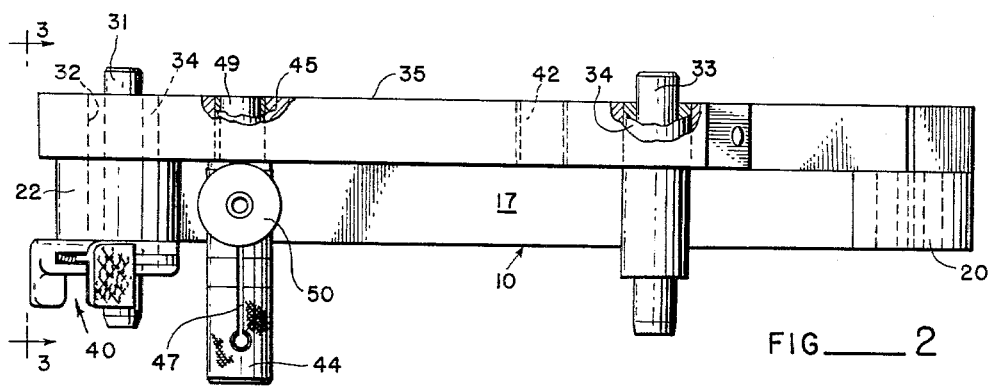
FIGURE 2 is a top plan view of this device in the same setting shown in FIGURE 1.
Figure 5:
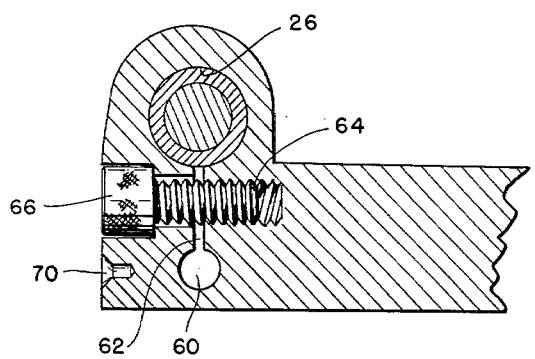
FIGURE 5 is a cross-sectional view taken along the line 5—5 of FIGURE 3 and showing the same on an increased scale.
Figure 6:
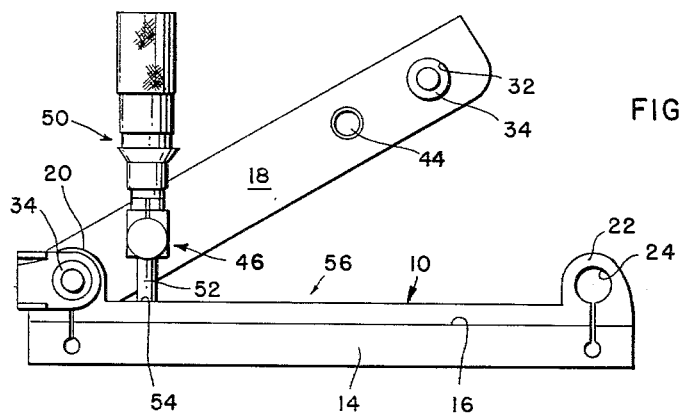
FIGURE 6 illustrates, in a view similar to FIGURE 1, the sine bar 18 as secured to the opposite face and end of base 10.

When the setting has been made by means of the micrometer, it is usually desirable to clamp the sine bar in fixed relationship to base 10 and to achieve this, the arrangement shown in FIGURE 1 and particularly in FIGURE 5, will provide means for securely clamping the bar. This arrangement consists of a transversely drilled hole 60 directly below each of the bores 26 and 24 and the two transverse holes, one set at each end of base 10, are each connected by slots 62 to the appropriate bore 24 and 26. The outer leg of each of the clamping arrangements is bored to accept an Allen head machine screw 64 and counter-bored to accept the head of the screw 66. The end of the threaded portion of the screw 64 is threaded into the main portion of the base and should be of generous size so that a large Allen wrench can be employed and when so employed, with the precise tolerances that this equipment requires, a very secure clamping means is provided which will clamp the bushing 34, and as this bushing is in effect part of the sine bar, a very secure clamping of the sine bar is achieved.

*Method of operation*

If, for example, an angle of 35° 27' is desired, the micrometer is set to read .5799 as this is the sine of the angle as given in all natural trigonometry tables, thus providing a convenient direct reading. With the clamping screw 66 loosened, the sine bar is lifted, the pin 49 of the micrometer adapter is fitted into the micrometer locating hole 44 and the sine bar is lowered until the end of the spindle or rod portion 52 of the micrometer seats flat on the base 10. Regardless of the angle of the sine bar, the micrometer always comes to rest on the base at a 90° angle. Then the clamping screw 66 is tightened, the micrometer is backed off from the base and the micrometer adapter is removed from the sine bar by a gentle pull on the handle of the micrometer adapter. With the sine bar thus set, work can be clamped for layout on an angle plate by placing the flat side of the sine bar and base against the angle plate with the work above, locating off the sine bar angle. By pushing the two pins 31 and 33, which fit inside the bushing 34 through the sine bar so that they extend beyond the flat side, the ends of the pins can be clamped in a milling vise, then the vise turned on the milling machine table until the sine bar indicates true to the table; the vise is thus set at the desired angle on the milling machine table.

With the pins extended through the sine bar, work may be positioned at any angle on a machine table by contacting the pins on the edge of the table or the edge of the T slots provided in the table. No showing is made of such tables as they are common on machine tools. With the pins 31 and 33 pushed back flush with the flat side of the sine bar, the desired angle may be obtained by contacting the sine bar with the work and indicating the base of the tool as with a dial indicator.

To set the compound on a lathe to a desired angle for cutting a taper or cone, whether it is an outside or an inside taper, the sine bar is set to one-half of the included angle with the micrometer, then clamped tight with the clamping screw 66. The sine bar is then placed between centers in the lathe with the center holes 70 and 71 provided in the base with the flat side of the sine bar on the top and leveled with a level.

An indicator may be clamped to the tool post and indicates along the sine bar with the compound until the compound is true to the sine bar.

The taper attachment on a lathe may be set to the sine bar by using a center in the headstock and a center in the tail stock engaging holes 70 and 71 and indicating the sine bar while the cross slide is engaged with the taper attachment.

To set the sine bar at the opposite angle, the clamp 40 is removed from the end of the bushing 34, clamping screw 66 is loosened and the sine bar 18 removed from base 10 and the procedure reversed at the other end of the base 10.

It is believed that it will be clearly apparent from the above description and the disclosure in the drawings that the invention comprehends a novel construction of micrometer setting sine bar.

Having thus described my invention, I claim:

1. A micrometer setting sine bar, comprising: a stepped base having a laterally extending foot portion; said base being precisely machined to provide that all opposite faces are parallel and all lines where said faces intersect are parallel; said base having upstanding bosses at each end having a length equal to the width of the principal portion of said base; cylindrical holes in said bosses transversely of said base and with their centers positioned on a line parallel to the longitudinal axis of said base; a pivoted sine bar having precisely machined sides with the opposite sides parallel; a transversely disposed bushing receiving hole adjacent each end of said sine bar and a pivot bushing secured in each of said holes to engage, selectively, the cylindrical holes in said base; means to secure one of said bushings in pivotable relationship in one of said cylindrical holes; a screw controlled clamping means for each of said bosses for clamping said sine bar in adjusted angular position; two micrometer locating holes disposed transversely of said sine bar and with their centers aligned with the centers of said bushing receiving holes in said sine bar; a micrometer adapter having a body bored transversely to receive a micrometer and having clasping means to secure said micrometer in fixed relationship with said adapter; said adapter having a pivot pin disposed at right angles to the axis of said micrometer and engageable with either of said micrometer locating holes.

2. The subject matter of claim 1 in which said micrometer locating holes are positioned one inch inside said cylindrical holes to provide direct reading of the micrometer settings from a table of natural trigonometrical sines.

3. The subject matter of claim 1 in which, when the pivoted sine bar is folded against the said foot portion, the two pivot bushings will position said pivoted sine bar so all its faces will be parallel to corresponding faces of said stepped base.

4. The subject matter of claim 1 in which a slidable pivot and alignment pin is coaxially disposed in each of said pivot bushings.

5. A micrometer setting sine bar, comprising: a base precisely machined to provide that all opposite faces are parallel and all lines where said faces intersect are parallel; said base having upstanding bosses at each end of said base; cylindrical holes in said bosses transversely of said base and with their centers positioned on a line parallel to the longitudinal axis of said base; a pivoted sine bar having precisely machined sides with the opposite sides parallel; a transversely disposed pivot and alignment pin adjacent each end of said sine bar to engage, selectively, the opposite ends of said base; means to secure one of said pins in pivotable relationship with said base; clamping means for each of said bosses for clamping said sine bar in adjusted angular position; micrometer locating holes disposed transversely of said sine bar and with their centers aligned with the centers of said pivot and alignment pins; a micrometer adapter having a body bored transversely to receive a micrometer and having clamping means to secure said micrometer in fixed relationship with said adapter and said adapter having a pivot pin disposed at right angles to the axis of said micrometer and engageable with either of said micrometer locating holes.

6. The combination according to claim 5 wherein said base is stepped in cross-section to provide a laterally extending foot portion; said foot portion being of sufficient laterally extent so that when the pivoted sine bar is in contact with the front face of the stepped portion of said base the foot portion and the pivoted sine bar will be in a common plane.

7. The combination according to claim 5 further provided with center holes, one in each end of said base for engagement with the alignment centers of a power machine tool and said center holes having their common axes parallel to the various sides and top and bottom of said base.

8. A micrometer setting sine bar, comprising: a base precisely machined to provide that all opposite faces are parallel and all lines where said faces intersect are parallel; said base having upstanding bosses at each end of said base; cylindrical holes in said bosses transversely of said base and with their centers positioned on a line parallel to the longitudinal axis of said base; a pivoted sine bar having precisely machined sides and edges with each pair of the opposite sides and edges parallel; said base having a step machined on one side having a cross-section substantially equal to the cross-section of said sine bar; a transversely disposed fixed tubular pivot and a slidable alignment pin, coaxially disposed in said fixed pivot, adjacent each end of said sine bar to engage, selectively, cylindrical holes; means to secure one of said pins in pivotable relationship with said base; clamping means for said bosses for clamping said sine bar in adjusted angular position; two micrometer locating holes disposed transversely of said sine bar and with their centers aligned with the centers of said pivot and alignment pins; a micrometer adapter having a body bored transversely to receive a micrometer and having clamping means to secure said micrometer in fixed relationship with said adapter and said adapter having a pivot pin disposed at right angles to the axis of said micrometer and engageable with either of said micrometer locating holes.

9. A micrometer setting sine bar, comprising: a base precisely machined to provide that all opposite faces are parallel and all lines where said faces intersect are parallel; said base having cylindrical holes transversely of said base at each end thereof and with their centers positioned on a line parallel to the longitudinal axis of said base; a pivoted sine bar precisely machined on all longitudinal faces with the opposite pairs of faces in parallel relationship; a transversely disposed pivot and alignment pin adjacent each end of said sine bar to engage, selectively, cylindrical holes; spring urged clamp means to secure one of said pins in pivotable relationship with said base; clamping means in said base for each end of said base for clamping said sine bar in adjusted angular position; two micrometer locating holes disposed transversely of said sine bar and with their centers aligned with the centers of said pivot and alignment pins; a micrometer adapter means to receive a micrometer and having clamping means to secure said micrometer in fixed relationship with said adapter; said adapter having a pivot pin disposed at right angles to the axis of said micrometer and engageable with either of said micrometer locating holes and said micrometer having an extendable, axial rod of considerable diameter disposed to bear on the upper surface of said base and to indicate when said rod is at right angles to said base.

References Cited by the Examiner
UNITED STATES PATENTS

| | | | |
|---|---|---|---|
| 1,476,573 | 12/23 | Allen | 33—174 X |
| 2,398,121 | 4/46 | Silvermaster | 33—174 |
| 2,498,867 | 2/50 | Trefz | 33—174 |
| 2,505,928 | 5/50 | Worby | 33—174 |

ISAAC LISANN, *Primary Examiner.*

LOUIS R. PRINCE, *Examiner.*